(12) United States Patent
Ehsani et al.

(10) Patent No.: US 8,956,208 B2
(45) Date of Patent: Feb. 17, 2015

(54) SYSTEMS FOR REMOVING PLANT MATERIAL FROM HARVESTED CROPS

(71) Applicant: University of Florida Research Foundation, Incorporated, Gainesville, FL (US)

(72) Inventors: Reza J. Ehsani, Lakeland, FL (US); Amanda Lynn Valentine, Lakeland, FL (US); Won Suk Lee, Gainesville, FL (US)

(73) Assignee: University of Florida Research Foundation, Gainesville, FL (US)

( * ) Notice: Subject to any disclaimer, the term of this patent is extended or adjusted under 35 U.S.C. 154(b) by 12 days.

(21) Appl. No.: 13/621,533

(22) Filed: Sep. 17, 2012

(65) Prior Publication Data
US 2013/0072268 A1   Mar. 21, 2013

Related U.S. Application Data

(60) Provisional application No. 61/534,998, filed on Sep. 15, 2011.

(51) Int. Cl.
| | | |
|---|---|---|
| *A01F 11/06* | (2006.01) | |
| *B02B 3/04* | (2006.01) | |
| *B07B 1/14* | (2006.01) | |
| *B07B 13/00* | (2006.01) | |
| *B07B 13/11* | (2006.01) | |
| *A01D 46/24* | (2006.01) | |

(52) U.S. Cl.
CPC ............... *B07B 1/14* (2013.01); *B07B 13/003* (2013.01); *B07B 13/11* (2013.01); *A01D 46/243* (2013.01)
USPC .......................................................... 460/29

(58) Field of Classification Search
USPC ........ 460/29, 36, 30, 31, 35, 58; 56/104, 103, 56/105
See application file for complete search history.

(56) References Cited

U.S. PATENT DOCUMENTS

| | | | | |
|---|---|---|---|---|
| 1,641,436 | A * | 9/1927 | Jett | 460/29 |
| 1,835,190 | A * | 12/1931 | Stansbury | 99/640 |
| 2,252,159 | A * | 8/1941 | Blank | 56/104 |
| 2,565,559 | A * | 8/1951 | Hurdelbrink | 15/3.11 |
| 2,576,292 | A * | 11/1951 | Flora | 460/33 |
| 2,647,353 | A * | 8/1953 | Dort | 56/14.2 |
| 2,705,960 | A * | 4/1955 | Stelter | 460/18 |
| 2,781,544 | A * | 2/1957 | Skrmetta | 452/5 |
| 2,801,659 | A * | 8/1957 | Carter | 99/585 |
| 2,927,616 | A * | 3/1960 | Bruner | 99/640 |

(Continued)

OTHER PUBLICATIONS

Florida Citrus Industry: Mechanical Harvesting Creates Up to 250 Percent More Debris Than Hand Harvesting, Study Finds, ScienceDaily (Mar. 1, 2011) http://www.sciencedaily.com/releases/2011/01/110118101614.htm.

(Continued)

*Primary Examiner* — Árpád Fábián-Kovács
(74) *Attorney, Agent, or Firm* — Thomas | Horstemeyer, LLP.

(57) ABSTRACT

A system for removing plant material from harvested crops includes a pinch roller conveyor including pairs of rotatable pinch rollers whose longitudinal axes are aligned with a length of the conveyor, the pinch rollers forming nips in which plant material can be caught and pulled down through the conveyor as the pinch rollers rotate, wherein first ends of the pinch rollers are laterally displaceable so that the pinch rollers can laterally separate from each other to facilitate passage of plant material.

21 Claims, 13 Drawing Sheets

(56) References Cited

U.S. PATENT DOCUMENTS

| | | | |
|---|---|---|---|
| 3,333,405 A * | 8/1967 | Bulin | 56/14.6 |
| 3,678,677 A * | 7/1972 | Miller et al. | 56/327.1 |
| 4,111,210 A | 9/1978 | Freeman et al. | |
| 4,340,070 A | 7/1982 | Keitel | |
| 4,524,572 A | 6/1985 | Wilde et al. | |
| 5,007,335 A | 4/1991 | Orman et al. | |
| 5,167,580 A * | 12/1992 | Rejsa et al. | 460/27 |
| 5,269,124 A * | 12/1993 | Barthel et al. | 56/16.4 B |
| 5,425,459 A | 6/1995 | Ellis et al. | |
| 5,451,184 A * | 9/1995 | Mietzel | 460/32 |
| 6,003,293 A * | 12/1999 | Boese | 56/327.1 |
| 6,199,703 B1 * | 3/2001 | Boese | 209/315 |
| 6,419,093 B2 * | 7/2002 | Boese | 209/670 |
| 6,442,920 B1 | 9/2002 | Peterson et al. | |
| 6,931,829 B2 | 8/2005 | Zehavi et al. | |
| 7,559,188 B2 | 7/2009 | Behmlander | |
| 7,921,628 B2 | 4/2011 | Meester | |
| 2005/0011175 A1 | 1/2005 | Nixon | |
| 2007/0214764 A1 | 9/2007 | Behmlander | |
| 2009/0282629 A1 | 11/2009 | Arrington | |

OTHER PUBLICATIONS

Wallace E. Huffan, The Status of Labor-saving Mechanization in Fruits and Vegetables May 25, 2010. Prepared for conference on "Immigration Reform: Implications for Farmers, Farm Workers and Communities," Washington, DC, May 27-28, 2010.

Timothy M. Spann, and Michelle D. Danyluk, Mechanical Harvesting Increases Leaf and Stem Debris in Loads of Mechanically Harvested Citrus Fruit, HortScience 45: 1297-1300 (2010).

Bora, et al. Field Evaluation of a Citrus Fruit Pick-up Machine, An ASABE Meeting Presentation, Paper No. 061141, Jul. 9-12, 2006.

\* cited by examiner

SYSTEMS FOR REMOVING PLANT MATERIAL FROM HARVESTED CROPS

CROSS-REFERENCE TO RELATED APPLICATION

This application claims priority to U.S. Provisional Application Ser. No. 61/534,998 filed Sep. 15, 2011, which is hereby incorporated by reference herein in its entirety.

BACKGROUND

Both manually and mechanically harvested citrus have various percentages of plant material, such as leaves and twigs, within their harvested loads that are transported to processing facilities. Such plant material can be infected with diseases such as citrus canker, black spot, and other potential bacterial or fungal diseases (e.g., citrus scab, phytophthora, alternaria brown spot, etc.). The infected material can blow out of the trailers, thus increasing the risk for disease development in other areas of the citrus industry.

Serious measures must be taken to avoid the spread of such diseases. Unfortunately, there is no commercial equipment available that can accomplish this task cost effectively.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As can be appreciated from the above discussion, it would be desirable to have means for removing plant material from harvested fruit prior to transporting the fruit to a processing plant. Disclosed herein are systems and methods for removing debris, such as plant material, from harvested crops, such as fruit. In some embodiments, the system is configured as a self-contained, portable unit that can be transported to and operated in the field. The system can comprise multiple processing components, including a small branch and leaf removal component that has longitudinal pinch rollers that can laterally separate to enable plant material to more easily pass through the component. With such functionality, the rollers experience much less wear.

In the following disclosure, various embodiments are described. It is to be understood that those embodiments are example implementations of the disclosed inventions and that alternative embodiments are possible. All such embodiments are intended to fall within the scope of this disclosure.

No device or system has been developed that exclusively concentrates on the removal of plant material from harvested citrus loads in the field. In-field cleaning is a new concept and has many advantages over cleaning at the processing plant. It reduces the costs associated with transferring non-fruit material to the plant and further reduces the cost of removing and disposing of these materials in the plant. Although devices or systems to aid in the removal of the plant material prior to being loaded into trailers are known, they are not without risk, have performance efficiency issues, and typically require an experienced operator to control them.

Figure 1:
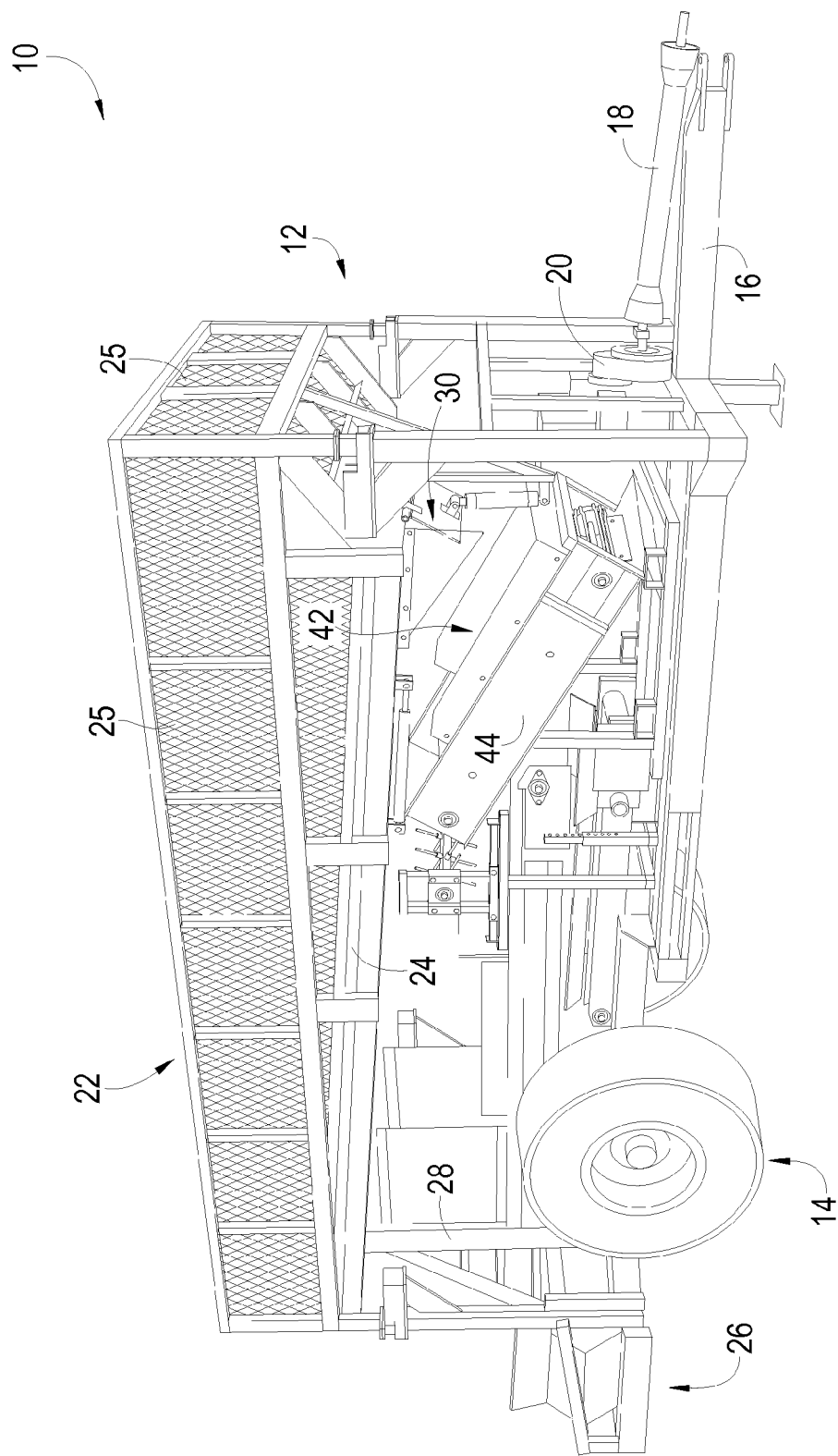
FIG. 1 is a perspective side view of an embodiment of a system for removing plant material from harvested crops.

Disclosed herein are plant material removal systems for harvested crops that function as mechanized crop and plant material separating machines. In some embodiments, the crops are citrus crops, such as oranges and other round fruit. FIG. 1 illustrates an embodiment of a plant material removal system 10. As is indicated in FIG. 1, the system 10 is configured as a self-contained, portable unit that generally comprises a frame 12 that is supported above the ground by wheels 14. At a front end of the frame 12 is a pulling tongue 16 that enables the system 10 to be hauled out to the field, such as a citrus orchard, by a vehicle, such as a tractor. The system 10 can derive hydraulic power from an independent source, or the system can utilize the tractor's power take off (PTO) for the hydraulic power source. The system 10 comprises a drive shaft 18 and a hydraulic pump 20 for those purposes.

Generally speaking, the plant removal system 10 includes three major sections, including an input hopper 22, one or more processing components, and an output conveyor 26, each of which can be driven by hydraulic power. The input hopper 22 comprises a large basket in which harvested fruit and plant material can be deposited, for example by a goat truck. In the illustrated embodiment, the hopper 22 is positioned at the top of the system 10 and extends along substantially the entire width and length of the system. The hopper 22 is defined by a floor 24 and multiple side walls 25. As is apparent from FIG. 1, the floor 24 is declined from back to front so that fruit and plant material deposited in the hopper 22 tend to collect toward the front end of the hopper. In some embodiments, the system 10 includes hydraulic cylinders 28 that can be operated to lift a rear end of the floor 24 to facilitate such collection. In some embodiments, the input hopper 22 is supported by one or more load cells (not identified) that can be used to determine the input weight (mass) of the material that is dropped into the hopper.

Figure 2:
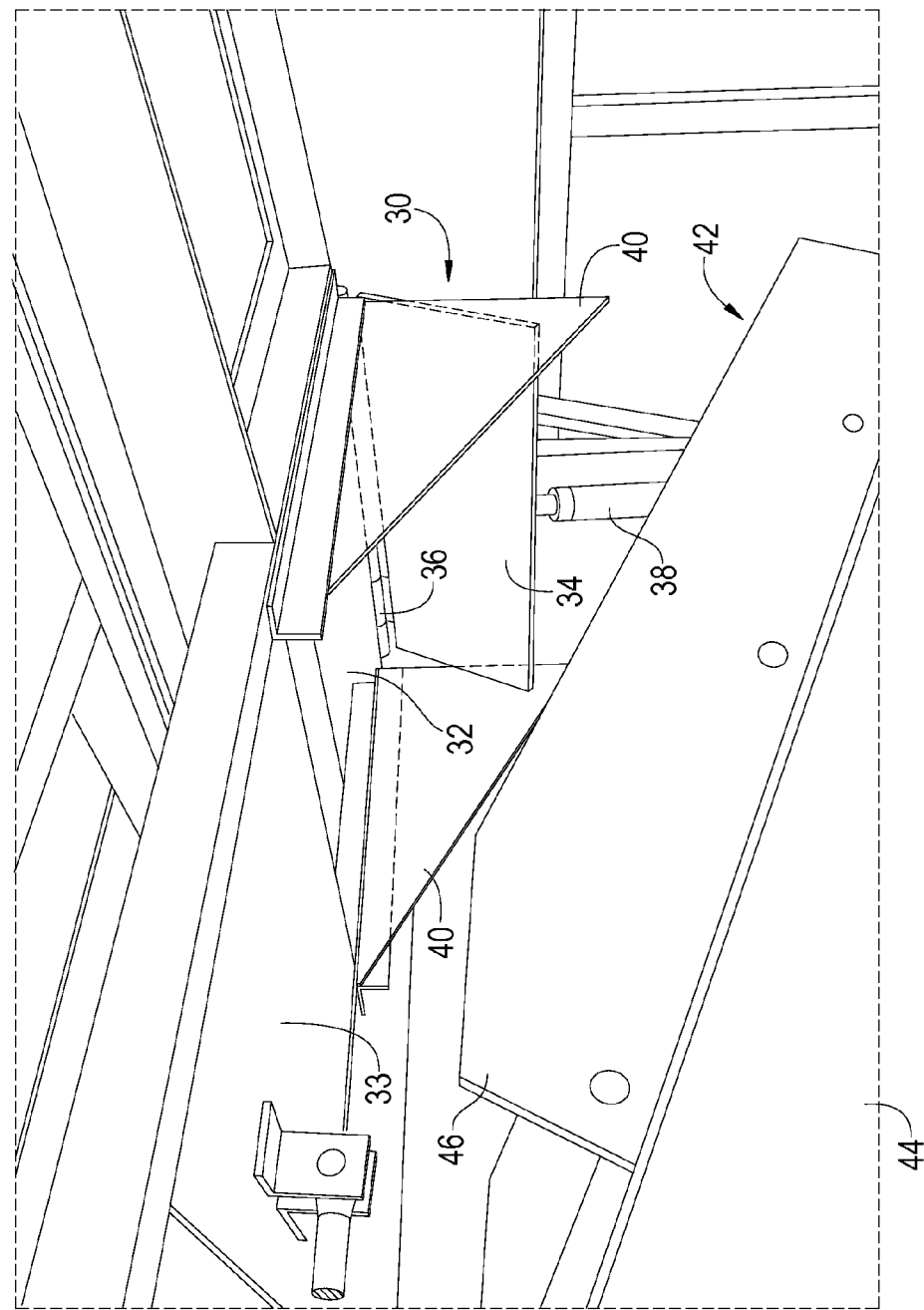
FIG. 2 is a detail view of the system of FIG. 1 illustrating a metering gate of the system.

As is shown in both FIGS. 1 and 2, the input hopper 22 further includes a metering gate 30 that can be used to pass fruit and plant material from the hopper to the processing components of the system 10. As is illustrated in FIG. 2, the metering gate 30 includes an opening 32 formed in the bottom of the floor 24 of the hopper 22 and a horizontal sliding door 33 that can be opened to enable the passage of the fruit and plant material. In addition, a trap door 34 that is attached to the floor with hinges 36 can be provided for further control of the flow of the fruit and plant material. The sliding door 33 and the trap door 34 can each be opened and closed using a hydraulic cylinder (hydraulic cylinder 38 shown for the trap door). With such a configuration, the sliding door 33 and/or the trap door 34 can be opened and closed as desired to control the flow of fruit and plant material from the hopper 22. As is further shown in FIG. 2, lateral guides 40 can be provided on the sides of the trap door 34 to ensure that the fruit and plant material do not fall out of the processing path.

Figure 3:
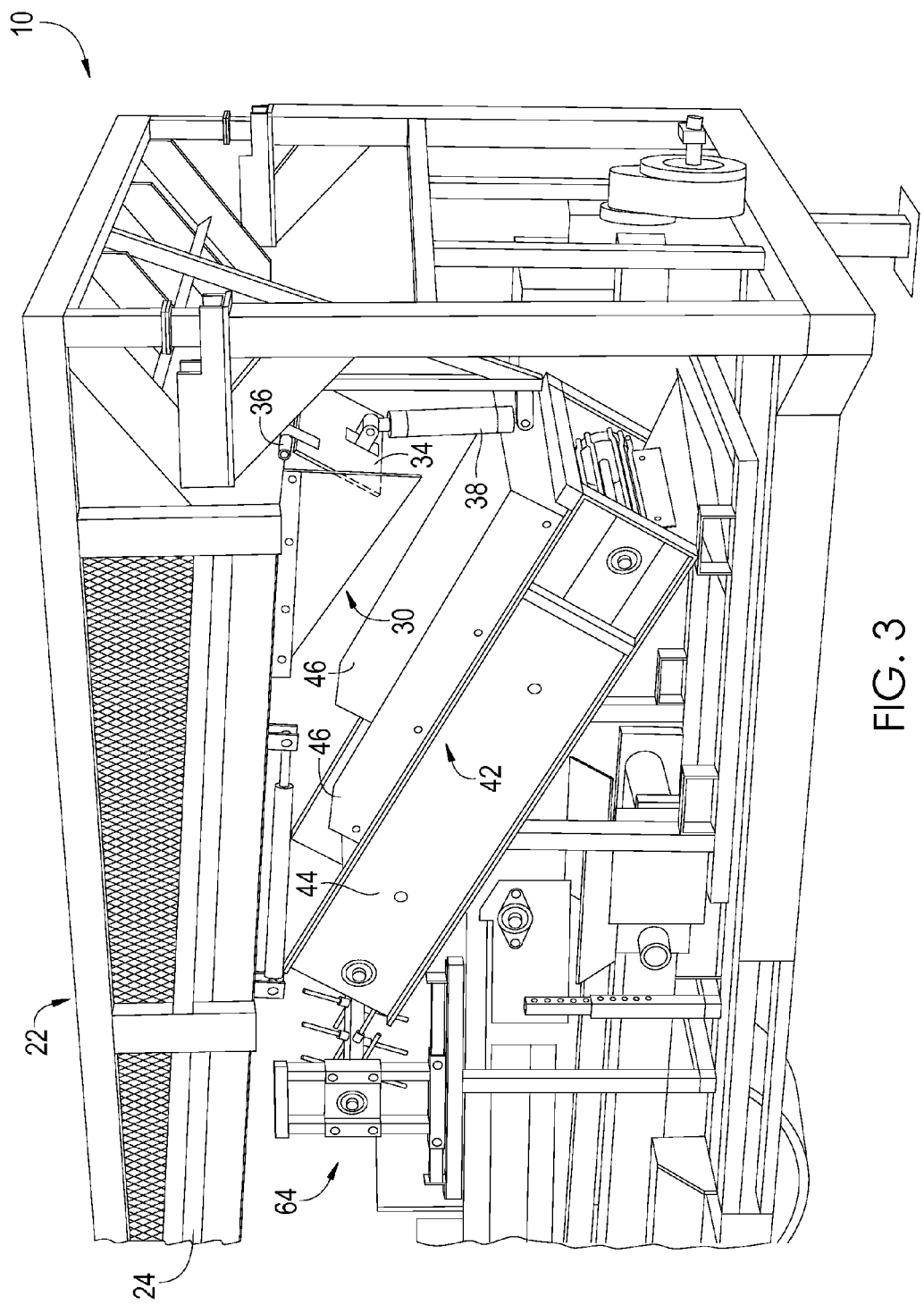
FIG. 3 is a detail view of the system of FIG. 1 illustrating a first processing component of the system.
Figure 4:
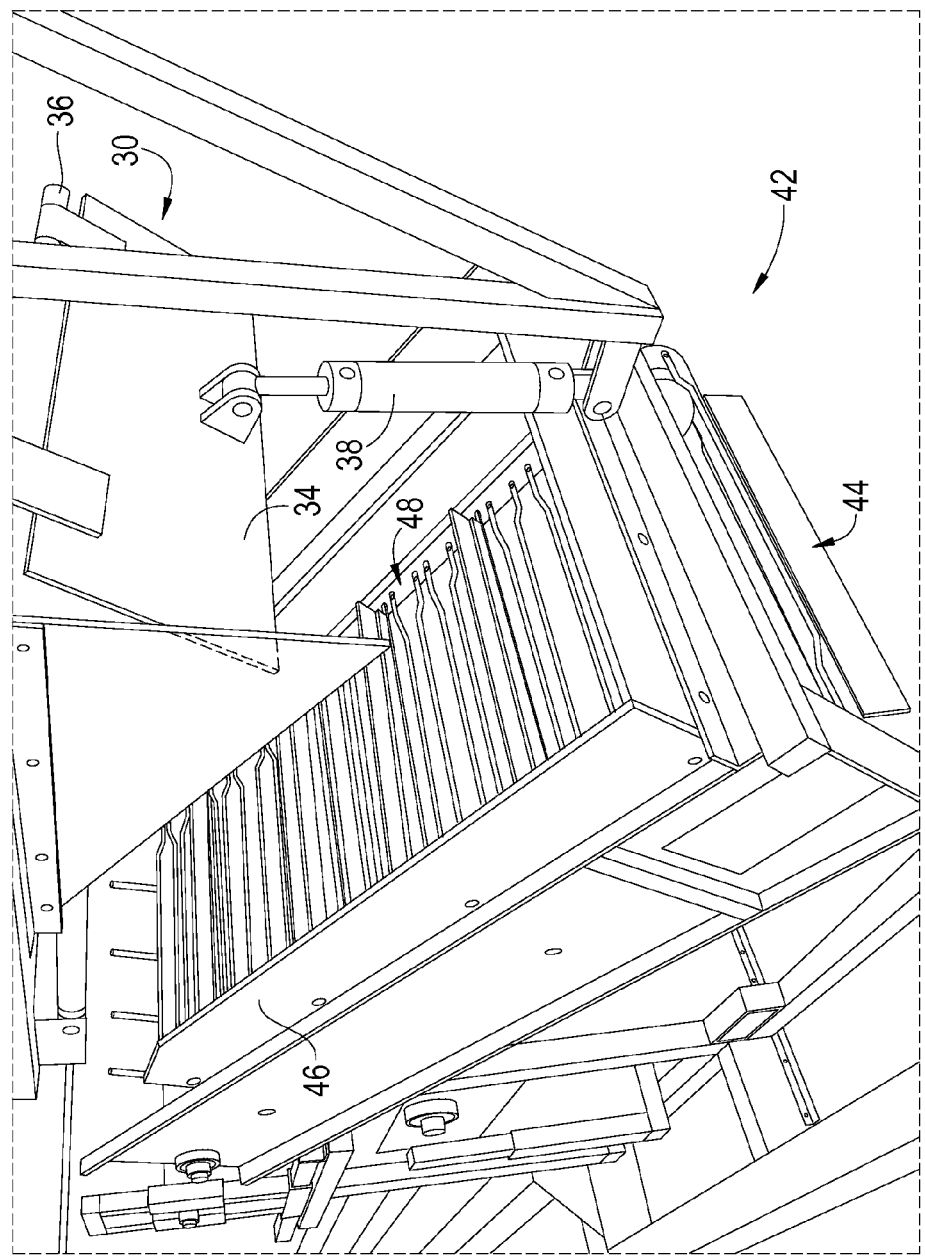
FIG. 4 is a detail view of the system of FIG. 1 further illustrating the first processing component shown in FIG. 3.

In the illustrated embodiment, the plant material removal system 10 includes three separate processing components, including a first processing component 42 that is positioned immediately below the metering gate 30. In some embodiments, the first processing component 42 is adapted to condition and remove relatively large branches and to remove unacceptably small fruit, each of which may be discarded as waste. Therefore, the first processing component 42 can also be referred to as the large branch conditioning/removal and small fruit removal component. As is apparent from FIGS. 3-5, the first processing component 42 comprises a push-bar conveyor 44 that is inclined so that its upstream end (which is positioned toward the front of the system 10) is lower than the downstream end (which is positioned toward the rear of the system). In some embodiments, the conveyor 44 is inclined at an angle of approximately 42 to 45 degrees. As is shown in FIG. 3, the conveyor 44 also includes lateral guides 46 that prevent fruit and plant material from going astray of the processing path.

Figure 5:
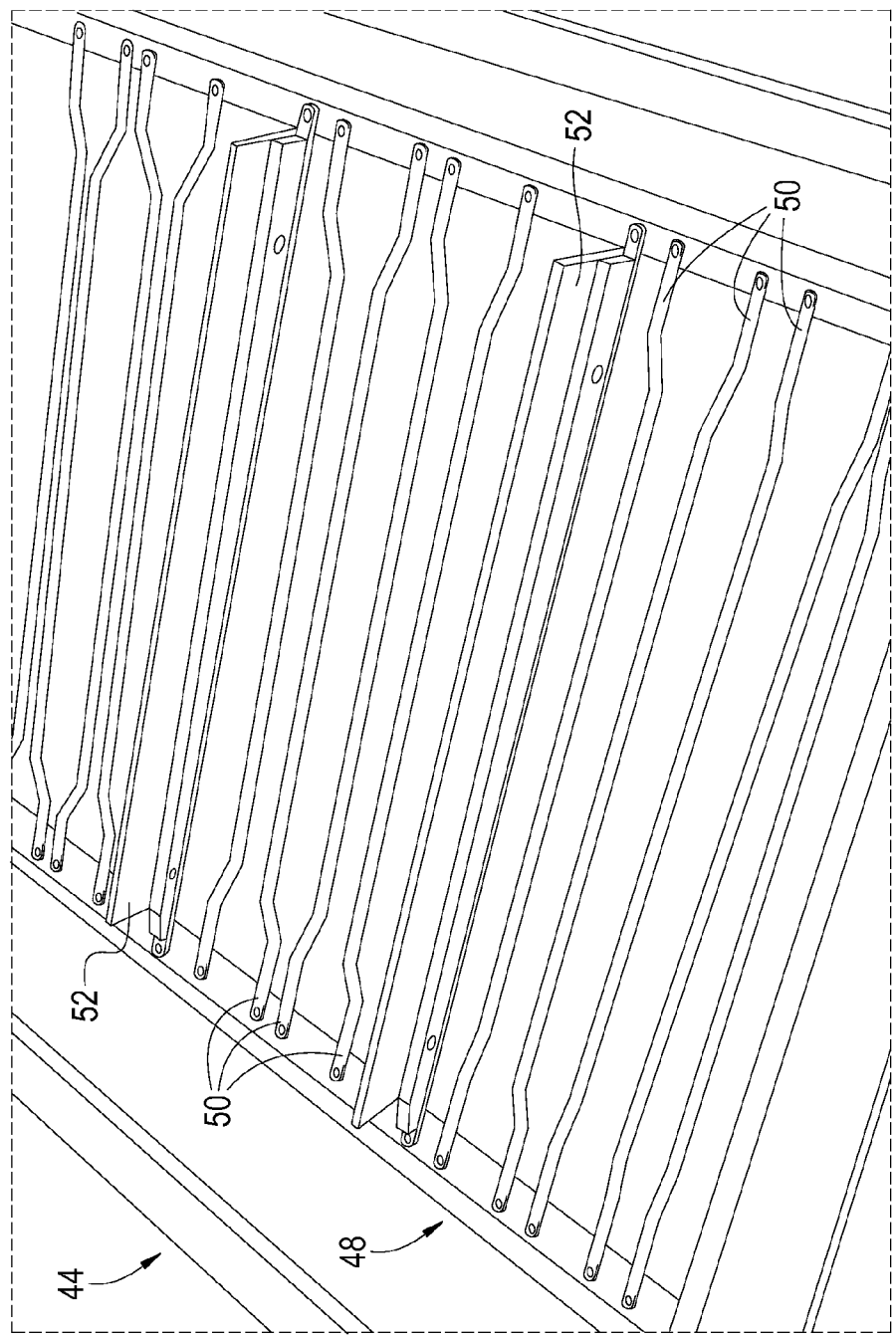
FIG. 5 is a perspective view of a conveyor belt of the first processing component shown in FIG. 4.

With particular reference to FIG. 5, the conveyor 44 includes a conveyor belt 48 that comprises multiple transverse support bars 50 and transverse push bars 52. The support bars 50 form the support plane of the belt 48 and support the fruit and plant material that passes through the metering gate 30 and falls onto the belt. As is shown in FIG. 5, the support bars 50 are arranged in a spaced configuration along a drive (length) direction of the belt 48 so that small fruit and some of the plant material can fall through the belt 48 so as to be separated from the fruit that is desired to be harvested. In addition, the spacing of the support bars 50 serves to catch and break up larger branches and dead wood. In some embodiments, the support bars 50 are separated from each other along the drive direction of the belt 48 by a distance of approximately 2.3 to 2.6 centimeters (cm). In addition, the belt 48 can have intermittent, relatively wide gaps defined by the support bars 50 that are separated from each other along the drive direction of the belt 48 by a distance of approximately 4.2 to 4.6 cm.

The push bars 52 comprise elongated strips of material that extend across the width of the conveyor belt 48 and up from the support plane defined by the support bars 50. The push bars 52 are spaced along the length of the conveyor belt 48 at regular intervals to form regions in which fruit and plant material can be deposited and conveyed. In some embodiments, the push bars 52 are spaced from each other along the drive direction of the belt 48 by a distance of approximately 23.5 to 24.5 cm. In operation, the push bars 52 ensure that the fruit does not roll backward along the length of the belt 48 while the fruit is conveyed upward by the belt.

Figure 6:
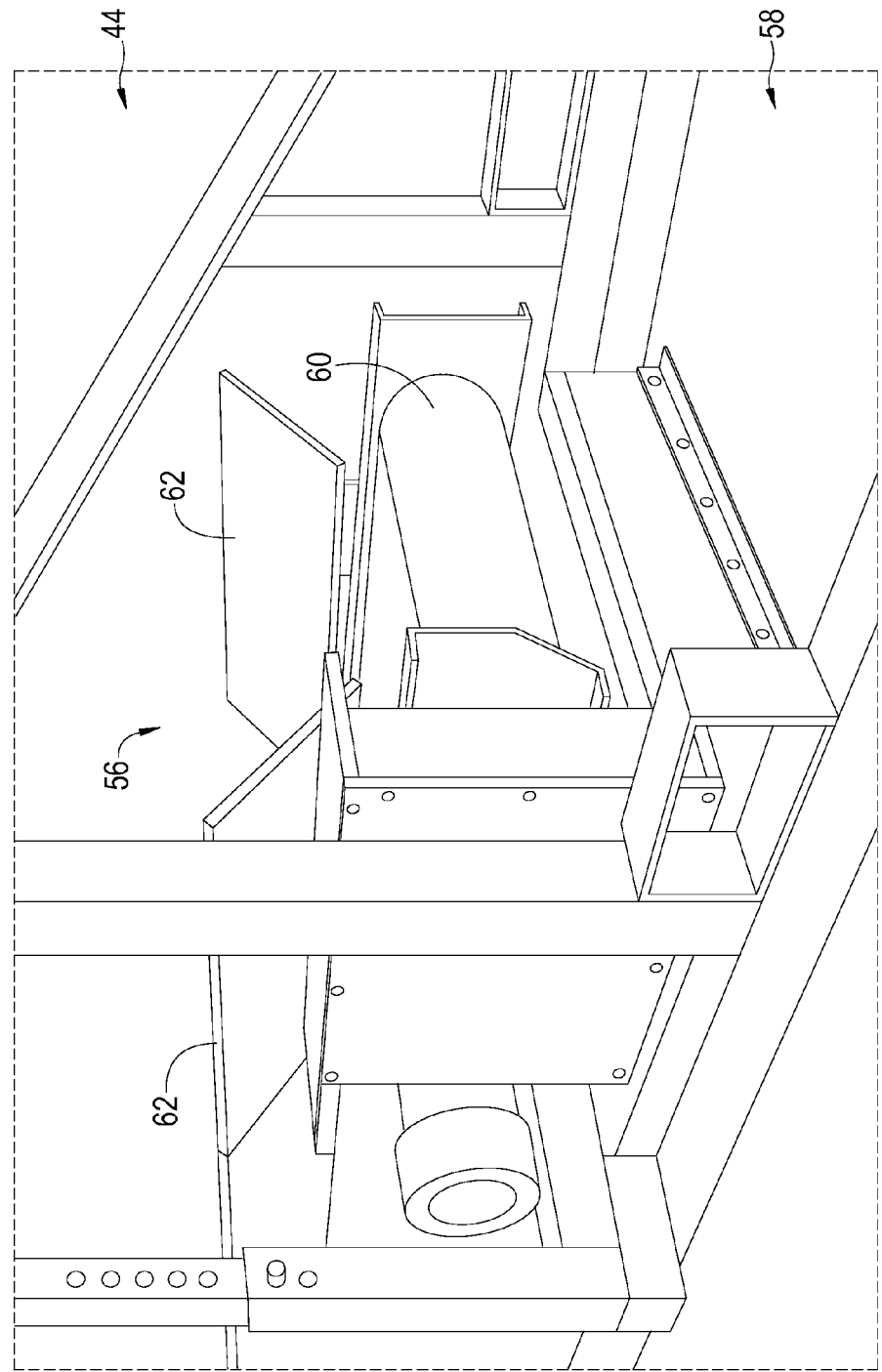
FIG. 6 is a detail view of the system of FIG. 1 illustrating a waste conveyor of the system.

As noted above, small fruit and some of the plant material can fall through the conveyor belt 48. That fruit and plant material can be collected by the plant material removal system 10. FIG. 6 shows a collection area 58 located immediately below the conveyor 44 upon which that fruit and plant material can collect so that it can be inspected, if desired, and discarded. As is also down in FIG. 6, the system 10 can further include a waste conveyor 56 that can be used to convey such material to the collection area 58. As is shown in FIG. 6, the waste conveyor 56 includes a conveyor belt 60 and lateral guides 62 that assist in guiding dropping fruit and plant material onto the belt.

Figure 7:
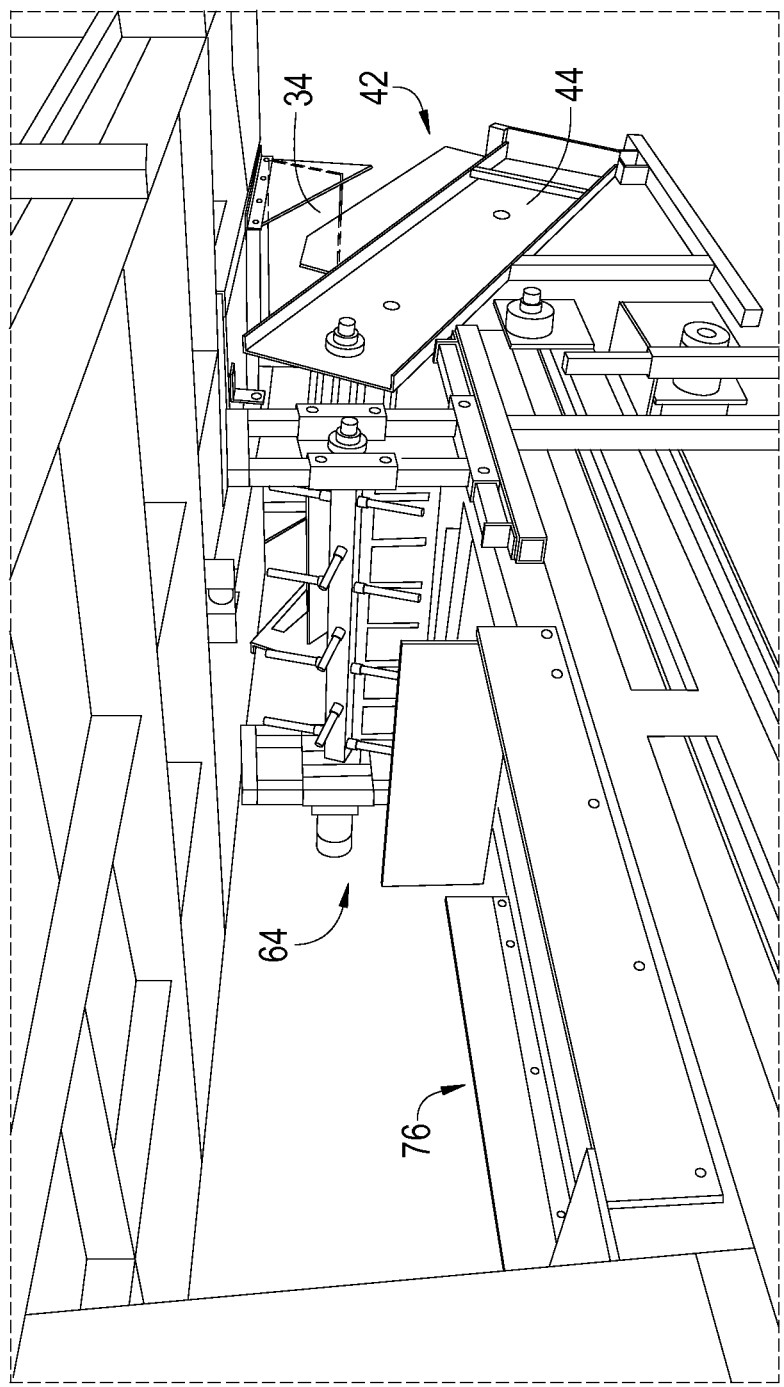
FIG. 7 is a detail view of the system of FIG. 1 illustrating a second processing component of the system.
Figure 8:
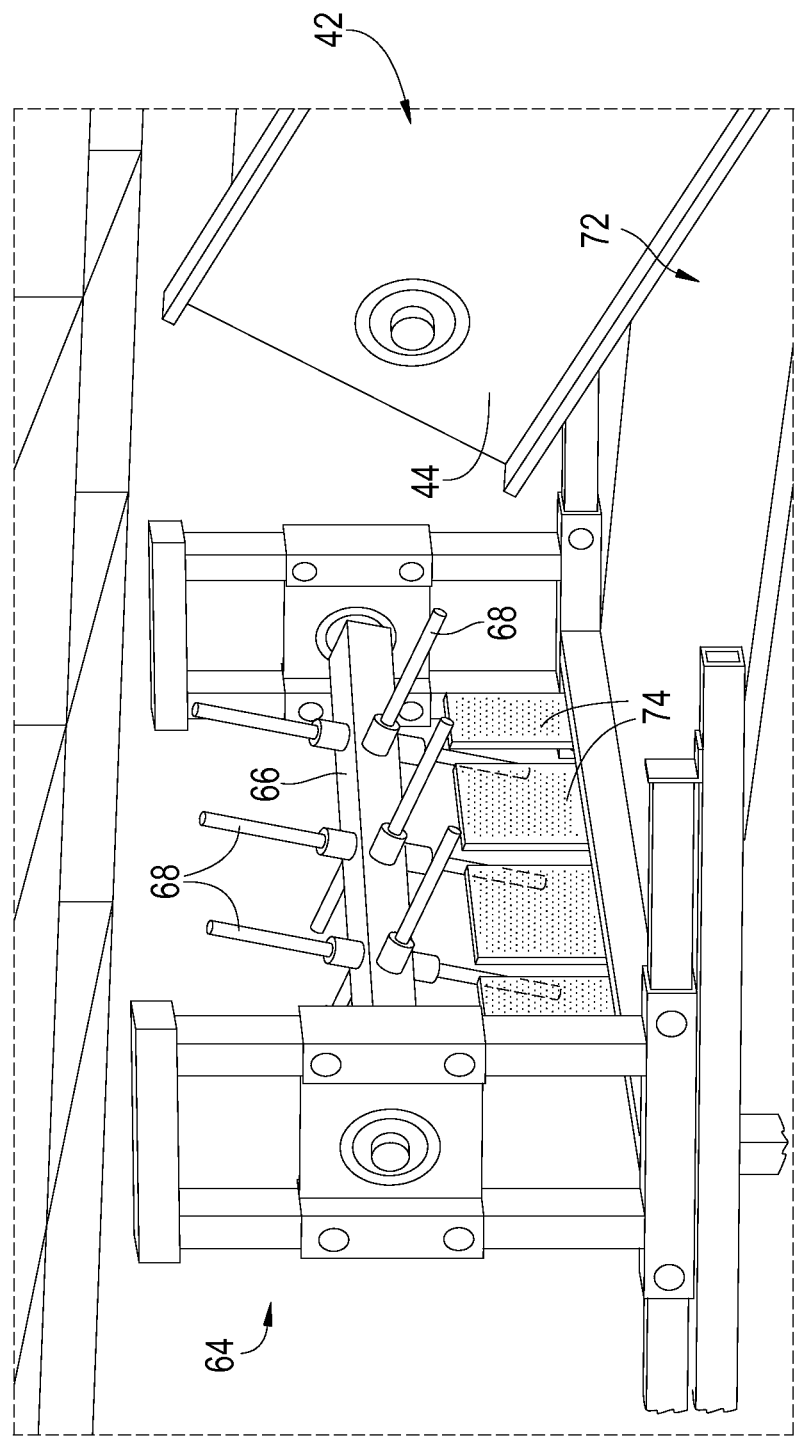
FIG. 8 is a detail view of the system of FIG. 1 illustrating an input end of the second processing component shown in FIG. 7.
Figure 9:
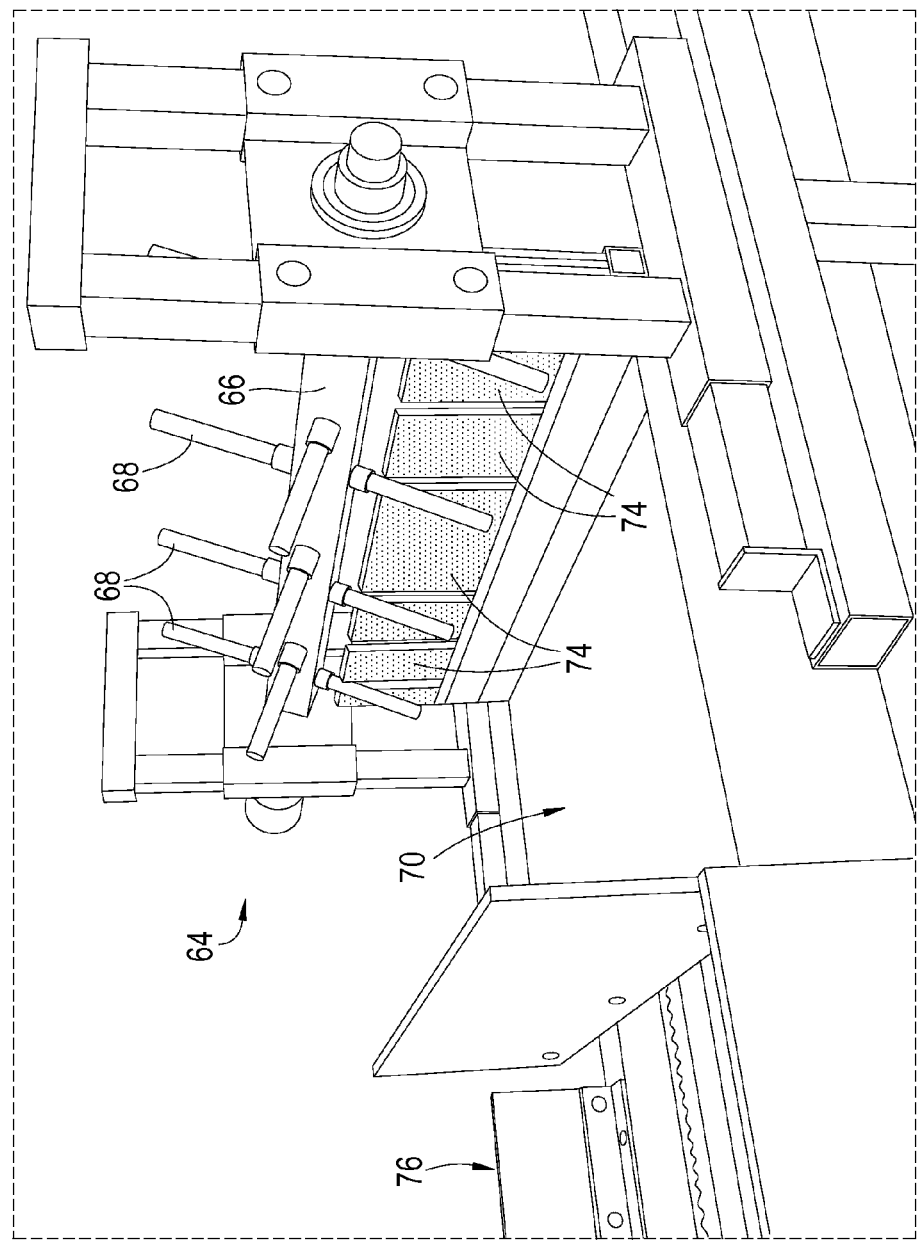
FIG. 9 is a detail view of the system of FIG. 1 illustrating an output end of the second processing component shown in FIG. 7.

As is apparent from FIGS. 7 and 8, a second processing component 64 is positioned at the output end of the conveyor 44 of the first processing component 42. In some embodiments, the second processing component 64 is adapted to remove relatively large branches from the flow of harvested fruit. Therefore, the second processing component 64 can also be referred to as the large branch removal component. As is shown in FIGS. 8 and 9, the second processing component 64 comprises a horizontal shaft 66 that is provided with a plurality of tines 68 that extend outward from the shaft in a generally normal direction. By way of example, the shaft 66 is as wide as the conveyor 44 and the tines 68 are approximately 12.5 to 13.0 cm long and are spaced from each other by approximately 9.5 to 10.0 cm along the length of the shaft. In operation, the shaft 66 rotates in a counterclockwise direction (from the perspective of FIGS. 7-9) so that any large branches that remain in the flow of harvested fruit after the first processing component 42 can be removed by pulling the branches from the flow and depositing them in a plant material collection area 70 positioned on the downstream end of the second processing component 64 (see FIG. 9).

Unlike those branches, the fruit conveyed by the first processing component 42 can drop down through a gap 72 formed between the conveyor 44 and the second processing component 64 to pass to the third processing component 76, which is positioned immediately below the second processing component. The second processing component 64 can further comprise resilient barriers 74 that prevent fruit from passing through the second processing component and into the plant material collection area 70, and that prevent removed branches from passing from the collection area 70 into the gap 72.

Figure 10:
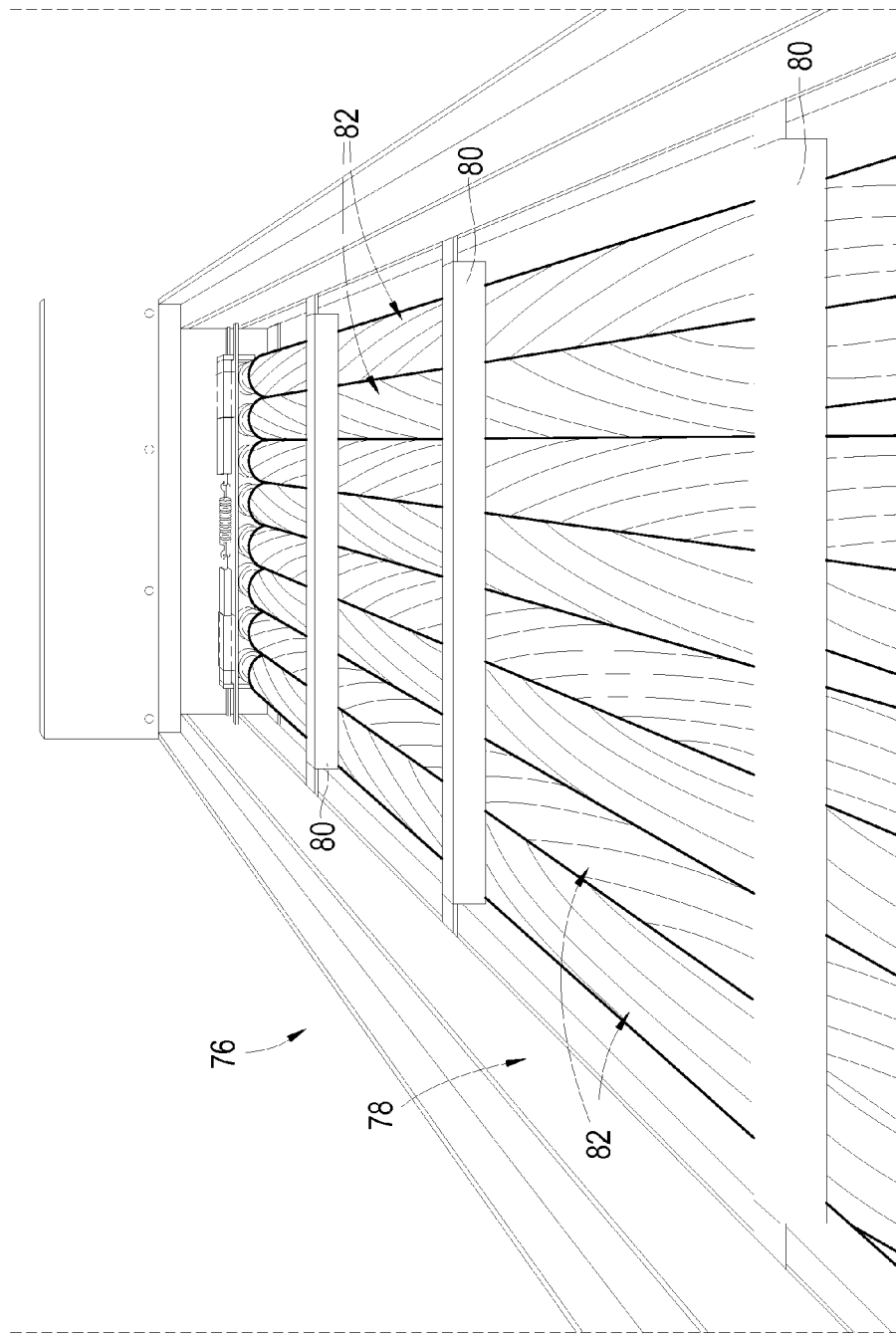
FIG. 10 is a detail view of the system of FIG. 1 illustrating a third processing component of the system.

FIG. 10 illustrates the third processing component 76 of the system 10, which is positioned downstream of the first processing component 42 and immediately below the second processing component 64. In some embodiments, the third processing component 76 is adapted to remove relatively small branches and leaves that remain in the flow of harvested fruit. Therefore, the third processing component 76 can also be referred to as the small branch and leaf removal component. As is shown in FIG. 10, the third processing component 76 comprises a further push-bar conveyor 78 that includes multiple push bars 80 that can be driven along the length of the conveyor. Like the push bars 52 of the conveyor 44 of the first processing component 42, the push bars 80 are spaced along the length of the conveyor 78 at regular intervals to form regions in which fruit and plant material can be deposited and conveyed. In some embodiments, the push bars 80 are spaced from each other along the drive direction of the conveyor 78 by a distance of approximately 60 to 61 cm. In operation, the push bars 80 drive the fruit and remaining plant material along the length of the conveyor 78. By way of example, the push bars 80 can be driven along the length of the conveyor 78 at a speed of approximately 0.5 to 0.7 meters per second.

Instead of having transverse support bars like the push-bar conveyor 44 of the first processing component 42, the push-bar conveyor 78 includes multiple pairs of elongated pinch rollers 82 whose longitudinal axes are aligned along the drive (length) direction of the conveyor. Accordingly, the conveyor 78 can also be referred to as a pinch roller conveyor. In the illustrated embodiment, the conveyor 78 includes four such pairs of pinch rollers 82, such that the conveyor comprises a total of eight pinch rollers. Each pair of rollers 82 forms a nip in which plant material can be caught. During operation, the pairs of rollers 82 are driven (rotated) in opposite directions such that small branches, twigs, and leaves that drop within the nips are pinched by the rotating rollers and pulled down through the conveyor 78 away from the fruit as the fruit is pushed along the conveyor by the push bars 80. By way of example, the rollers are driven at a speed of approximately 360 to 365 revolutions per minute.

Figure 11:
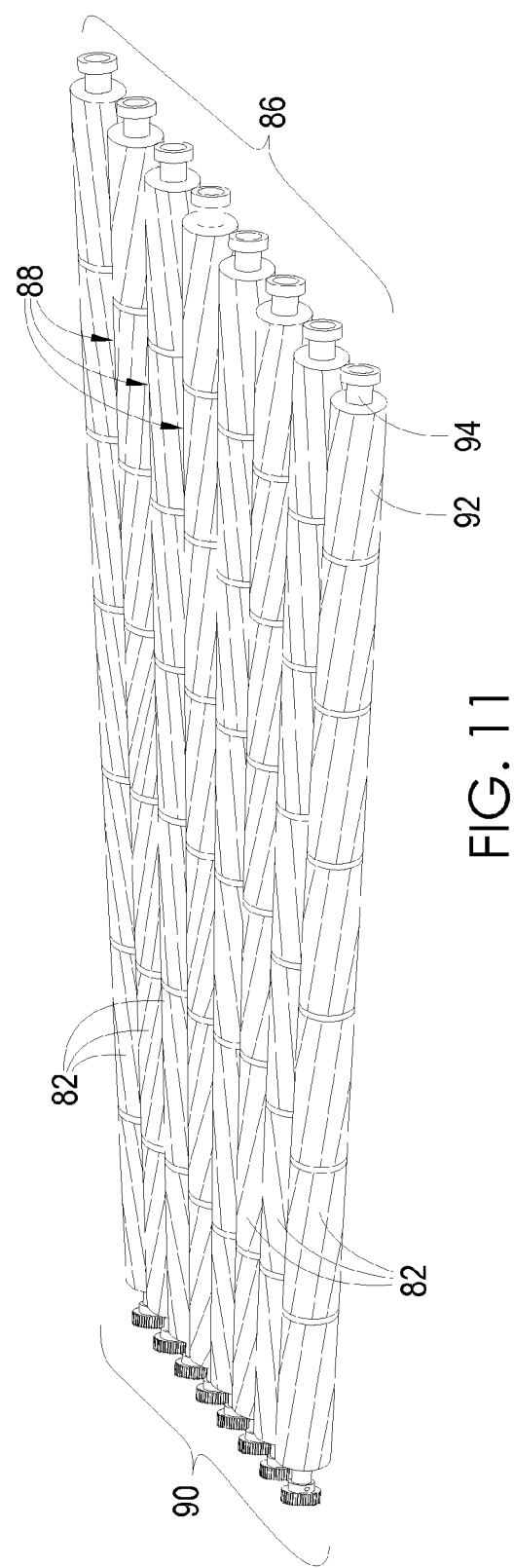
FIG. 11 is a schematic perspective view of rollers of the third processing component shown in FIG. 10.

Each pinch roller 82 is provided with a textured resilient outer surface comprising alternating grooves and flights that facilitate the gripping and passage of plant material between the pairs of rollers. The outer surface is either formed by an outer layer or coating. In some embodiments, the resilient outer surface is made of a rubber or silicone material. Because such outer surfaces tend to wear quickly through normal use, the ends of the rollers 82 at least one end of the conveyor 78 are adapted to laterally separate under the force of plant material that becomes caught between pairs of rollers. In some embodiments, the upstream ends of the rollers 82 can be laterally displaced to either side. Such functionality is illustrated in the schematic view of FIG. 11. As is shown in that figure, the upstream ends 86 of the rollers 82 can be laterally displaced from each other to open up gaps 88 through which plant material can pass. In some embodiments, the downstream ends 90 are fixed such that they cannot be laterally displaced. By being able to separate at least one end, the rollers 82 wear less and therefore have better longevity. FIG. 11 further illustrates an arrangement in which each roller 82 includes a resilient outer layer 92 that surrounds a rigid inner shaft 94.

Figure 12:
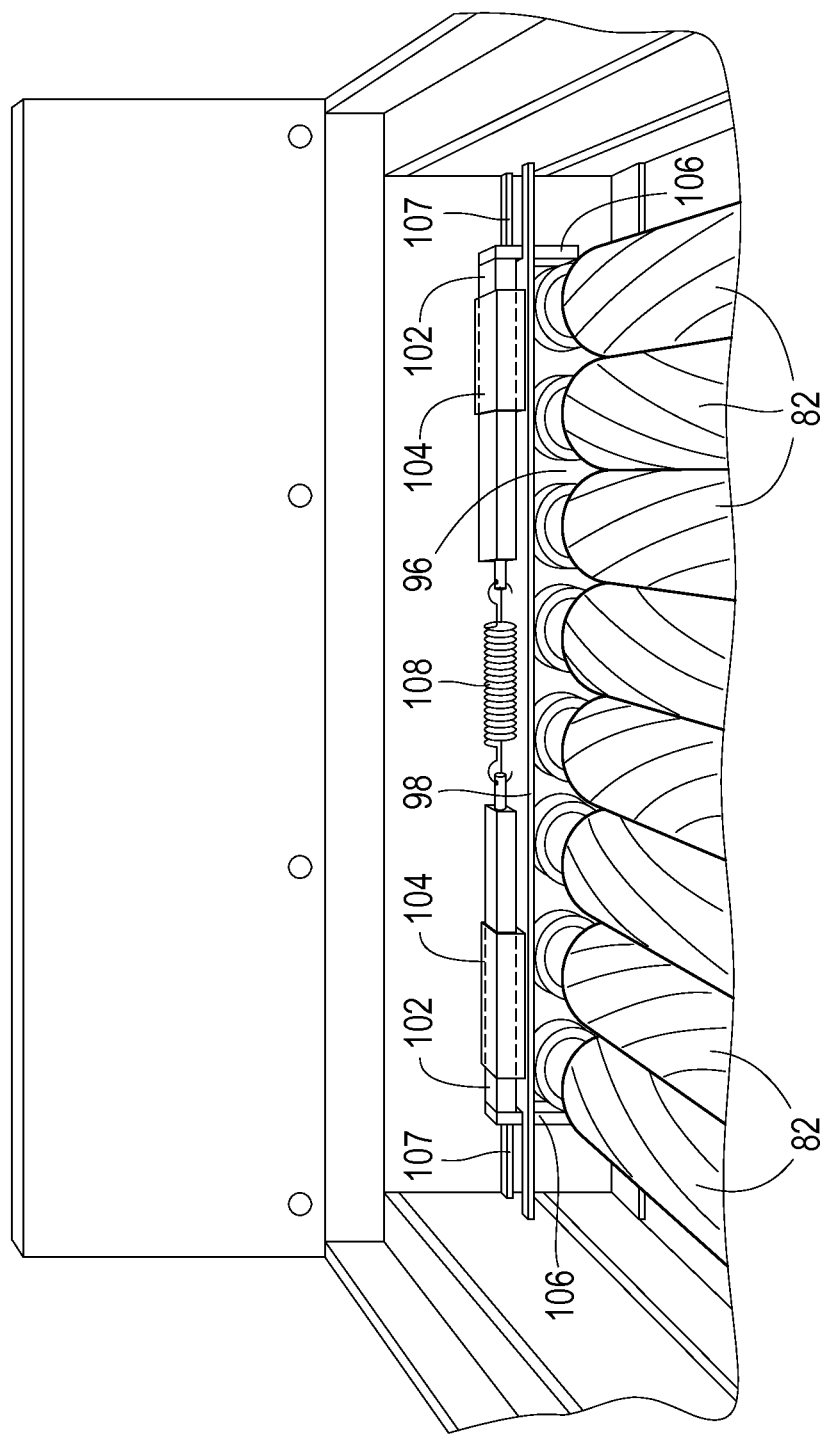
FIG. 12 is a detail view of the system of FIG. 1 illustrating a tensioning apparatus of the third processing component shown in FIG. 10.

FIG. 12 illustrates a tensioning apparatus that can be used to urge the ends of the pinch rollers 82 together and provide the separation functionality described above. As is shown in that figure, the shafts 94 of the rollers 82 can be contained within a transverse channel 96 defined in part by an upper guide 98. Although the shafts 94 are confined to the channel 96, they are free to travel laterally along its length. Such lateral travel is limited by end brackets 102 positioned at each end of the channel 96. In the illustrated embodiment, the end brackets 102 are slidingly secured to the top of the upper guide 98 by further brackets 104 but have end portions 106 that extend down through openings 107 in the upper guide 98 so that they can contact the shafts 94 of the outermost rollers 82. The brackets 104 enable the end brackets 102 to laterally slide relative to the upper guide 98 so as to enable the lateral travel and separation of the rollers 82. Such sliding is limited, however, by a tension spring 108 whose ends are each connected to one of the end brackets 102 and that pulls the end brackets toward each other. In some embodiments, the spring 108 is made of zinc-plated, spring tempered steel wire having a diameter of approximately 0.08 inches (in.). The spring 108 can be approximately 5/8 in. in diameter and approximately 6.5 in. long. The spring 108 can have a deflection at load of approximately 2.02 in. and a spring rate of approximately 5.31 pound per inch (lbs/in.). With such a configuration, plant material that is caught between a pair of rotating rollers 82 can momentarily separate the rollers to enable the material to more easily pass between the rollers. As soon as the material passes between the rollers, however, the gap formed between the rollers 82 will close under the closing force provided by the end brackets 102, which operate under the tension force of the spring 108.

Figure 13:
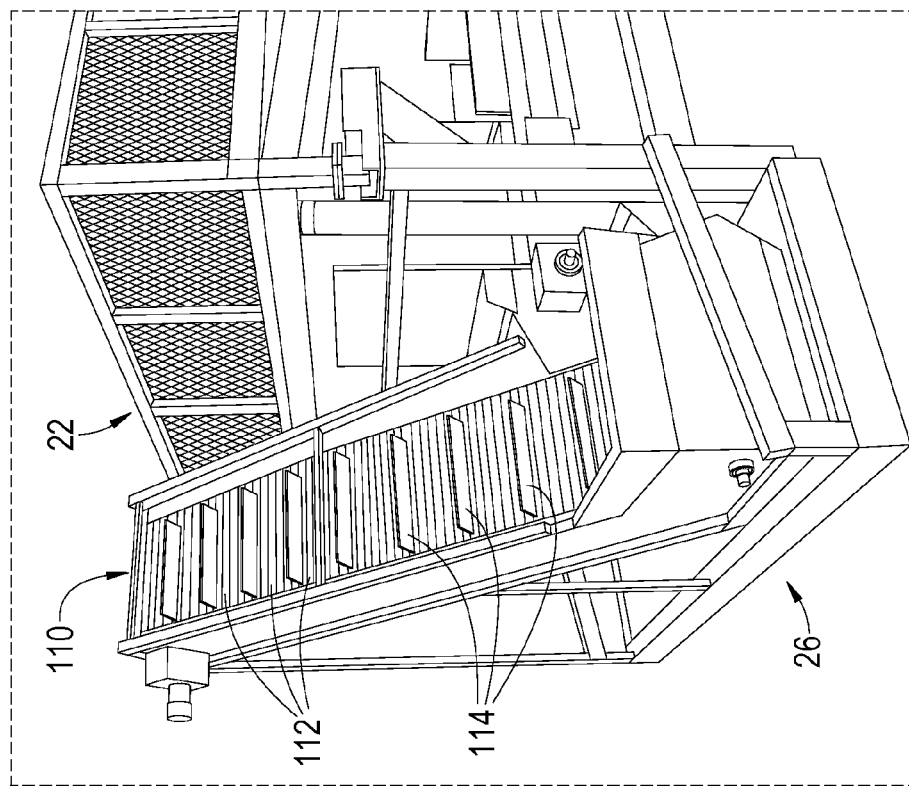
FIG. 13 is a detail view of the system of FIG. 1 illustrating an output conveyor of the system.

With reference next to FIG. 13, positioned downstream from the third processing component 76 is the output conveyor 26. In some embodiments, the output conveyor 26 is a two-section, telescoping incline conveyor that is adapted to transport the clean fruit exiting the third processing component 76 into a transport vehicle, such as a trailer, for transport to the processing facility. In the illustrated embodiment, the output conveyor 26 is configured as a push-bar conveyor that includes a conveyor belt 110 that comprises multiple transverse support bars 112 and transverse push bars 114.

The various components of the plant example material removal system 10 having been described above, operation of the system will now be discussed. First, the hopper 22 of the system 10 is loaded with harvested fruit, and any accompanying plant material, using a goat or lift truck. If desired, an operator can monitor and record the initial load weight (mass). The input hopper metering gate 30 is then opened, which enables the fruit and plant material drop down onto the conveyor 44 of the first processing component 42. As the fruit and plant material are conveyed by the conveyor 44, the smaller fruit and at least some of the plant material passes through the gaps in the conveyor belt 48. That fruit and plant material can, for example, drop onto the collection area 58 as well as the waste conveyor 56, which can then convey the fruit and plant material to the collection area.

After reaching the output end of the conveyor 44, larger branches that remain in the flow of harvested fruit can be removed by the second processing component 64. In particular, as the shaft 66 and its tines 68 are rotated, such branches are drawn from the fruit flow and are deposited in the collection area 70 at the output end of the second processing component 64.

Unlike those branches, the fruit and smaller plant material that exit the conveyor 44 drop down through the gap 72 between the first and second processing components 42 and 64 (see FIG. 8) and onto the conveyor 78 of the third processing component 76. The fruit and plant material are then moved along the length of the conveyor 78 by the push bars 80. During this time, the pinch rollers 82 of the conveyor 78 are spinning. Because the conveyor 78 comprises pairs of rollers 82 that spin in opposite directions, the pairs of rollers form nips with which remaining plant material can be caught and pulled down through the conveyor 78. Although such an action would normally quickly wear the resilient outer surfaces of rollers 82, the aforementioned ability of the ends of the rollers to laterally separate greatly reduces this wear. In particular, instead of the resilient surfaces having to deform greatly to enable passage of the plant material, the resilient surfaces need only deform to a limited degree because additional space is provided for the plant material by the lateral separation of the rollers 82.

In the above disclosure, a particular embodiment of a plant material removal system was described. It is reiterated that other embodiments are possible. In other embodiments, smaller versions of the system can be used for direct mechanical harvester mounting. For example, a modified version of the third processing component can be retrofitted onto existing mechanical harvesting machines. In addition, the third processing component can be used on existing trash removal systems used in processing plants to remove soft and moldy fruits to reduce the microbial load. Moreover, the third processing component could be used as a stand-alone plant material removing machine in a variety of applications.

It is also noted that while removal of plant material from harvested fruit has been discussed, the disclosed systems and methods could be used to remove plant material from other crops. More generally, the systems and methods could be used to remove unwanted debris from other objects.

The invention claimed is:

1. A system for removing plant material from harvested crops, the system comprising:

a pinch roller conveyor including a plurality of rotatable pinch rollers whose longitudinal axes are substantially aligned with a length of the pinch roller conveyor, the plurality of rotatable pinch rollers being arranged in a row that extends across a width of the pinch roller conveyor, each pinch roller of the plurality of rotatable pinch rollers being in contact with an adjacent pinch roller in the row, the plurality of rotatable pinch rollers being grouped in pairs of pinch rollers across the row, each pair of pinch rollers forming a nip in which plant material can be caught and pulled down through the pinch roller conveyor as the pairs of pinch rollers rotate, where a first end of each pinch roller of the plurality of rotatable pinch rollers is supported by a transverse channel that allows unconstrained lateral displacement of the first end of each pinch roller in a transverse direction across the width of the pinch roller conveyor while constraining vertical displacement of the first end of each pinch roller in a direction perpendicular to the length and width of the pinch roller conveyor, the lateral displacement of the plurality of rotatable pinch rollers limited by end brackets positioned adjacent to the first ends of outermost pinch rollers located at opposite ends of the row of rotatable pinch rollers, and where the first ends of adjacent pinch rollers laterally separate from each other to facilitate passage of the plant material.

2. The system of claim 1, wherein the first ends of the plurality of rotatable pinch rollers are upstream ends of the plurality of rotatable pinch rollers.

3. The system of claim 1, wherein the transverse channel comprises an upper guide and a lower guide within which the first ends of the plurality of rotatable pinch rollers can be laterally displaced.

4. The system of claim 3, wherein the pinch roller conveyor comprises a single tensioning apparatus that urges all of the first ends of the plurality of rotatable pinch rollers together within the transverse channel.

5. The system of claim 4, wherein the tensioning apparatus comprises first and second end brackets that contact the first end of the outermost pinch rollers and a tension spring that pulls the first and second end brackets toward each other.

6. The system of claim 1, wherein each pinch roller of the plurality of pinch rollers comprises a resilient outer surface provided around a rigid inner shaft.

7. The system of claim 1, wherein the pinch roller conveyor further includes spaced push bars adapted to drive the harvested crops along the length of the pinch roller conveyor and the plurality of rotatable pinch rollers.

8. The system of claim 1, further comprising a further conveyor positioned upstream of the pinch roller conveyor, the further conveyor comprising a conveyor belt that includes spaced transverse support bars that support the harvested crops.

9. The system of claim 8, wherein the further conveyor is inclined and also includes push bars that extend up from the conveyor belt to prevent the harvested crops from rolling backward along a length of the belt.

10. The system of claim 1, further comprising a rotatable transverse shaft positioned upstream of the pinch roller conveyor, the rotatable transverse shaft comprising tines that extend outward from a horizontal shaft and that are adapted to remove branches from the harvested crops.

11. The system of claim 1, further comprising an input hopper in which the harvested crops are received for processing by the system.

12. The system of claim 1, further comprising an output conveyor adapted to convey processed crops from the system.

13. The system of claim 1, wherein the system is supported by wheels that can be used to transport the system.

14. The system of claim 1, wherein each pinch roller of the plurality of rotatable pinch rollers comprises a second end opposite to the first end, the second end fixed in position thereby preventing lateral displacement of the second end.

15. A system for removing plant material from harvested crops, the system comprising:
    a pinch roller conveyor including:
        a transverse channel extending across an end of the pinch roller conveyor;
        a plurality of rotatable pinch rollers having first and second ends and longitudinal axes that are substantially aligned with a length of the pinch roller conveyor, the plurality of rotatable pinch rollers being arranged in a row with the first end of each pinch roller of the plurality of rotatable pinch rollers positioned within the transverse channel, each pinch roller being in contact with an adjacent pinch roller in the row, the plurality of rotatable pinch rollers being grouped in pairs of pinch rollers across the row, each pair of pinch rollers forming a nip in which plant material can be caught and pulled down through the pinch roller conveyor as the pairs of pinch rollers rotate, where the first end of each pinch roller of the plurality of rotatable pinch rollers is not fixed in position within the transverse channel thereby allowing lateral displacement of the first end of each pinch roller within the transverse channel, and where the first ends of adjacent pinch rollers laterally separate from each other to facilitate passage of the plant material; and
        a tensioning apparatus comprising end brackets that urge all of the first ends of the plurality of rotatable pinch rollers together within the transverse channel, the end brackets positioned at opposite ends of the transverse channel.

16. The system of claim 15, wherein the tensioning apparatus comprises first and second end brackets that contact the first end of outermost pinch rollers of the plurality of rotatable pinch rollers in the transverse channel, and a tension spring that pulls the first and second end brackets toward each other.

17. The system of claim 15, wherein the second ends of the plurality of rotatable pinch rollers are fixed in position thereby preventing lateral displacement of the second ends.

18. The system of claim 16, wherein the tension spring is secured to inner ends of the first and second end brackets, and end portions at outer ends of the first and second end brackets extend across at least a portion of the transverse channel.

19. The system of claim 18, wherein the end portions extend across the transverse channel through openings in an upper guide of the transverse channel.

20. The system of claim 15, further comprising a large branch removal component positioned upstream from the pinch roller conveyor, the large branch removal component adapted to remove branches from the harvested crops.

21. The system of claim 20, further comprising a push bar conveyor positioned upstream from the large branch removal component, the push bar conveyor adapted to remove undersized crops from the harvested crops.

* * * * *